April 7, 1925.                                                                 1,532,252
M. L. MARTUS ET AL
MEANS FOR PROVIDING AND RELEASING OIL IN BATTERY SOLUTIONS
Filed May 24, 1924

INVENTORS
Martin L. Martus, Edmund H. Becker,
Harold B. Schoenmehl
BY
Chamberlain & Newman
ATTORNEYS.

Patented Apr. 7, 1925.

1,532,252

UNITED STATES PATENT OFFICE.

MARTIN L. MARTUS, OF WOODBURY, AND EDMUND H. BECKER AND HAROLD B. SCHOENMEHL, OF WATERBURY, CONNECTICUT.

MEANS FOR PROVIDING AND RELEASING OIL IN BATTERY SOLUTIONS.

Application filed May 24, 1924. Serial No. 715,564.

*To all whom it may concern:*

Be it known that MARTIN L. MARTUS, of Woodbury, and EDMUND H. BECKER and HAROLD B. SCHOENMEHL, of Waterbury, citizens of the United States, and residents of Woodbury and Waterbury, respectively, in the counties of Litchfield and New Haven, respectively, and State of Connecticut, have invented certain new and useful Improvements in Means for Providing and Releasing Oil in Battery Solutions, of which the following is a specification.

The present invention relates to an improved method and means for providing and releasing oil in battery solutions, and has for an object to provide for the placing of a layer or film of oil upon the surface of the solution, and without the danger of coating the battery elements with oil, which in the use of the battery retards the chemical action of the electrolyte and renders the elements themselves non-conductive. In practice, the elements are immersed and the oil poured on the solution. This requires a separate container for the oil and familiarity with the cell as the inexperienced often make the error of pouring the oil on the solution before immersing the elements.

We are aware of the fact that others have recognized this difficulty and that in the zinc-copper oxide and caustic soda cells the oil has been mixed with the dry soda, but this practice makes it necessary to pass the elements through the layer of oil to place them in the battery jar.

An object of our invention is to avoid any possible chance of the oil coming in contact with the active elements of the cell.

The purpose of the oil layer, as is well known, is to form an air seal to protect the active parts of the battery, and prevent evaporation and capillary creepage of the electrolyte to the outside of the jar.

It is proposed in the present invention to provide oil containing means adapted to be assembled with the assembled elements of the battery for immersion in the electrolyte in the battery jar, the oil containing means being of such a nature as to be acted upon by the electrolyte solution, releasing the oil, which, being lighter than the solution, rises to the top as a sealing layer or film. In this manner the elements are immersed in the electrolyte without passing through or contacting with the oil, and after complete immersion the oil is released, so that there is no possibility of the elements being coated with the oil.

With the above and other objects in view, embodiments of the invention are shown in the accompanying drawings, and these embodiments will be hereinafter more fully described with reference thereto, and the invention will be finally pointed out in the claims.

Figure 1:
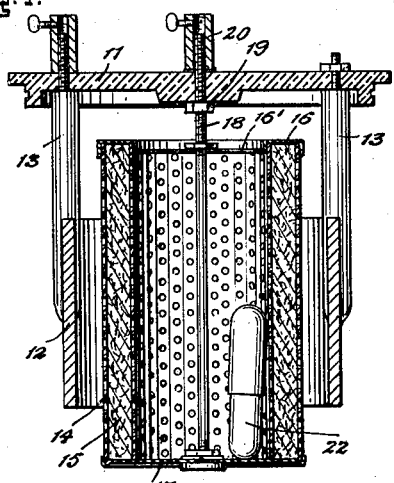
Fig. 1 is a vertical sectional view of a primary battery assembly of positive and negative elements and cover, with an oil container, according to the invention, assembled therein.
Figure 2:
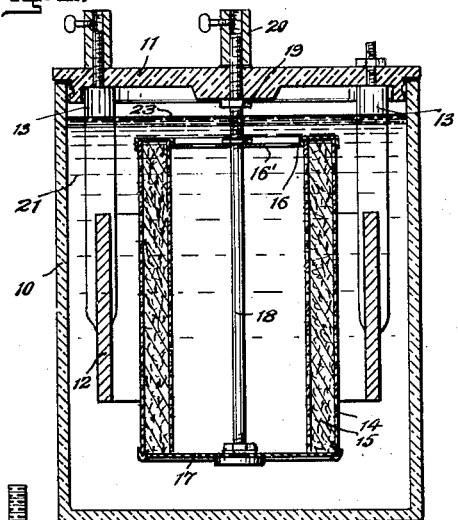
Fig. 2 is a vertical sectional view of the complete battery, after immersion of the elements in the electrolyte and release of the oil.
Figure 3:
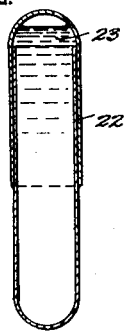
Fig. 3 is a sectional view of the oil container shown in Fig. 1, and of the capsule type.

Referring to the drawings, and more particularly to Figs. 1 to 3 thereof, the battery shown therein, by way of example, comprises a jar 10, a flanged cover 11 of porcelain or the like, a positive zinc 12, in the form of a cylinder suspended from the cover by posts 13, and a negative element, in the form of a cylindrical double-walled perforated basket 14 filled with copper oxid 15, being closed at the top by a flanged cover 16 having openings 16' therein, and having its base 17 and said cover 16 secured centrally to a central supporting rod 18 suspended from the cover and secured thereto by nuts 19 and 20. The positive and negative elements and the cover constitute an assembled element, adapted to be engaged as a unit with the jar, the elements being immersed in the electrolyte solution 21 therein.

According to the invention the oil container is assembled with the battery elements before their immersion in the electrolyte. As shown in Figs. 1 to 3 the container is in the form of a two-part telescoping capsule 22, of a suitable substance adapted to be acted upon by the electrolyte solution to release the oil, and the same is filled with the sealing oil 23, preferably mineral oil. The capsule may be sealed, after filling, by wetting the same slightly at the contacting telescoping surfaces.

The capsule is assembled with the battery elements, preferably as shown in Fig. 1 by being placed in the basket structure of the negative element, and the assembled unit is then immersed in the electrolyte in the battery jar, as shown in Fig. 2, the capsule being dissolved by the electrolyte after complete immersion of the elements, and the released oil rising to the top of the solution, where it forms a sealing layer or film, as clearly shown. Inasmuch as the elements are entirely covered with the electrolyte before release of the oil, there is no possibility of the same becoming effected thereby.

Figure 4:
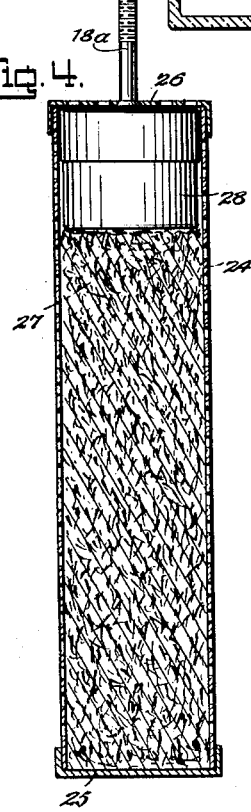
Fig. 4 is a vertical sectional view of another type of negative battery element, with a modified form of oil container assembled therein.
Figure 5:
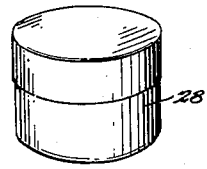
Fig. 5 is a perspective view of the container as shown in Fig. 4.

In Figs. 4 and 5, there is shown a different type of negative electrode element consisting of a cylindrical perforated tube 24 closed at its lower end by a flanged cap 25, and at its upper end by a flanged and perforated cap 26 having a supporting stem 18ª, copper oxid 27, in the form of scale being contained within the tube up to a level in spaced relation to the top. Within this space at the top there is provided an oil container 28, in the form of a cylindrical telescoping capsule of suitable material adapted to be dissolved in the electrolyte solution of the battery. It is obvious that upon immersion of the element in the electrolyte the container 28 will dissolve, releasing the oil which flows through the perforations of the cap 26 to the surface of the electrolyte.

Figure 6:
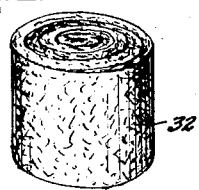
Fig. 6 is a perspective view of a still further modified form of oil container, in the form of an oil absorbent roll.

In Fig. 6 there is shown another modified form consisting of a roll of absorbent material 32, as cotton, which is saturated with oil, upon immersion in the electrolyte solution, the oil contained in the cotton roll, and which is lighter than the solution, flows out of the cotton to the top of the solution. This absorbent oil carrier may be used instead of the container as shown in Figs. 4 and 5, being attached to or carried within the assembled battery elements.

Figure 7:
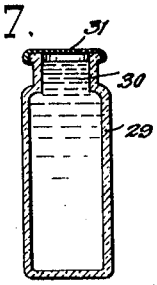
Fig. 7 is a sectional view of a further modified form of oil container, and of the bottle type.

In Fig. 7 there is shown a further modified form of oil container, consisting of glass bottle 29, containing oil 30, and provided with a sealing stopper 31 of suitable material adapted to be dissolved by the electrolyte solution of the battery, it being obvious that upon immersion of the bottle in the solution the stopper will dissolve, thereby releasing the oil, which being lighter than the solution, flows out of the bottle to the surface of the solution.

We have illustrated and described preferred and satisfactory embodiments of the invention, but it will be obvious that changes may be made therein, within the spirit and scope thereof, as defined in the appended claims.

Having thus described our invention, what we claim and desire to secure by Letters Patent is:

1. The combination with a battery element, of independent oil containing means carried thereby adapted upon immersion in an electrolyte solution to release the oil.

2. The combination with a battery element, of oil containing means, other than said element, adapted to be immersed with said element in an electrolyte solution, said means adapted upon immersion to release the oil.

3. The combination with a battery element, of an oil container formed of material other than the element adapted to be acted upon in an electrolyte solution to release the oil.

4. The combination with a battery element, of an oil container other than the element adapted to be effected by immersion in an electrolyte solution to release the oil.

5. The combination with a battery element including a jar adapted to contain electrolyte solution, a cover for the jar, and battery elements connected to said cover, forming an assembled unit, said elements adapted to be immersed in the solution in said jar upon placing said cover thereon, of independent oil containing means carried by said unit adapted upon immersion in said solution to release the oil.

6. The method of providing a layer of sealing liquid on a battery solution which consists in placing the liquid in a container other than the active battery elements and adapted to be effected by the electrolyte solution of the battery to release the liquid, and immersing said container with the battery elements in said solution, whereby the elements are covered with said solution before release of the liquid.

7. The method of sealing a battery solution with a layer of oil which consists in placing the oil in a container other than the active battery elements and adapted to be effected by the solution of the battery to release the oil whereby the act of immersing the elements in said solution will automatically release the oil.

8. The method of sealing a battery solution with a layer of oil which consists of placing an oil container other than the active elements of the battery within the cell said container adapted to be effected by a battery fluid of greater specific gravity than that of the oil.

9. The method of sealing a battery solution with a layer of oil which consists in placing the oil in a container other than the active elements of the battery and adapted to be held by the battery whereby the addition of a fluid to the battery will release the oil.

Signed in the county of New Haven and State of Connecticut this 22nd day of May A. D., 1924.

MARTIN L. MARTUS.
EDMUND H. BECKER.
HAROLD B. SCHOENMEHL.

Witnesses:
PAUL F. SCHOENMEHL,
HARRY T. HUBERT.